United States Patent
Saraya et al.

(10) Patent No.: US 9,998,416 B2
(45) Date of Patent: Jun. 12, 2018

(54) SELECTING SUBSETS OF PARTICIPANTS IN ELECTRONIC MESSAGE THREADS

(71) Applicant: International Business Machines Corporation, Armonk, NY (US)

(72) Inventors: Siddharth K. Saraya, Raniganj (IN); Gurudutt K. Vyudayagiri Jagannath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 14/668,054

(22) Filed: Mar. 25, 2015

(65) Prior Publication Data

US 2016/0285815 A1    Sep. 29, 2016

(51) Int. Cl.
| | | |
|---|---|---|
| G06F 15/16 | (2006.01) |
| H04L 12/58 | (2006.01) |
| G06Q 10/10 | (2012.01) |
| H04L 29/06 | (2006.01) |
| H04L 29/12 | (2006.01) |
| G06F 3/048 | (2013.01) |
| B60B 7/00 | (2006.01) |
| B60B 7/04 | (2006.01) |

(Continued)

(52) U.S. Cl.
CPC ............ *H04L 51/22* (2013.01); *B60B 7/0013* (2013.01); *B60B 7/04* (2013.01); *B60B 7/066* (2013.01); *B60B 7/14* (2013.01); *G06F 3/048* (2013.01); *G06Q 10/107* (2013.01); *H04L 29/06* (2013.01); *H04L 51/00* (2013.01); *H04L 51/14* (2013.01); *H04L 51/16* (2013.01); *H04L 51/32* (2013.01); *H04L 51/34* (2013.01); *H04L 61/1564* (2013.01); *H04L 65/1069* (2013.01); *H04L 65/4076* (2013.01); *B60B 2360/10* (2013.01); *B60B 2360/32* (2013.01); *B60B 2900/325* (2013.01); *B60B 2900/572* (2013.01); *H04L 51/04* (2013.01)

(58) Field of Classification Search
CPC .... G06Q 10/107; H04L 65/1069; H04L 51/04
USPC .................................................. 709/206, 204
See application file for complete search history.

(56) References Cited

U.S. PATENT DOCUMENTS

| | | | |
|---|---|---|---|
| 8,103,729 B2 | 1/2012 | Tornabene et al. | |
| 8,346,864 B1 * | 1/2013 | Amidon | H04L 65/1069 |
| | | | 709/204 |

(Continued)

FOREIGN PATENT DOCUMENTS

| | | |
|---|---|---|
| WO | 2012178121 A1 | 12/2012 |
| WO | 2013055964 A1 | 4/2013 |

OTHER PUBLICATIONS

U.S. Appl. No. 15/150,677 Entitled "Selecting Subsets of Participants in Electronic Message Threads", filed May 10, 2016.

(Continued)

*Primary Examiner* — Kyung H Shin
(74) *Attorney, Agent, or Firm* — Brian M. Restauro

(57) ABSTRACT

Embodiments of the present invention provide methods, computer program products, and systems for selecting subsets of participants in electronic message threads. Embodiments of the present invention can be used to exclude participants based, at least in part, on activity level from message conversations, thereby streamlining message conversation and reducing unwanted message communications.

17 Claims, 6 Drawing Sheets

(51) Int. Cl.
*B60B 7/06* (2006.01)
*B60B 7/14* (2006.01)

(56) References Cited

U.S. PATENT DOCUMENTS

| | | | |
|---|---|---|---|
| 8,639,229 B2 | 1/2014 | Apfel et al. | |
| 8,639,762 B2 | 1/2014 | Rasmussen et al. | |
| 2002/0138582 A1* | 9/2002 | Chandra | G06Q 10/107 709/206 |
| 2007/0050488 A1 | 3/2007 | Joyner, Jr. et al. | |
| 2010/0076989 A1 | 3/2010 | Jakobson | |
| 2012/0036197 A1* | 2/2012 | Bishop | G06Q 10/107 709/206 |
| 2012/0191546 A1 | 7/2012 | Phelan et al. | |
| 2013/0018960 A1 | 1/2013 | Knysz et al. | |
| 2015/0263995 A1* | 9/2015 | Mahood | H04L 51/04 715/753 |

OTHER PUBLICATIONS

Appendix P.: List of IBM Patents or Patent Applications Treated as Related, Dated May 10, 2016, 2 pages.

Nikolai, Aksana, "How to Reply to a Single Person in iPhone Group MMS?", Demand Media, azcentral, retrieved on Jan. 15, 2015, 1 page, <http://yourbusiness.azcentral.com/reply-single-person-iphone-group-mms-25221.html>.

"Available alert for a collaboration group if any member logs in", An IP.com Prior Art Database Technical Disclosure, Authors et. al.: Disclosed Anonymously, IP.com No. 000205689, IP.com Electronic Publication: Apr. 4, 2011, pp. 1-2, <http://ip.com/IPCOM/000205689>.

"Starting Collaborations based on Custom Thresholds of Group Member Availability", An IP.com Prior Art Database Technical Disclosure, Authors et. al.: Disclosed Anonymously, IP.com No. 000214360, IP.com Electronic Publication: Jan. 23, 2012, pp. 1-3, <http://ip.com/IPCOM/000214360>.

U.S. Appl. No. 14/979,691 Entitled "Selecting Subsets of Participants in Electronic Message Threads", filed Dec. 28, 2015.

Appendix P.: List of IBM Patents or Patent Applications Treated as Related, Dated Jan. 28, 2016, 2 pages.

IP.com, "A Venn-diagrammatic approach of visualizing the recipients list in email clients, enabling partial selection of recipients from a distribution list", IP.com, IPCOM000228526D, Jun. 17, 2013.

Saraya et al.; U.S. Appl. No. 15/260,457, filed Sep. 9, 2016; Entitled "Selecting Subsets of Participants in Electronic Message Threads".

List of IBM Patents or Patent Applications Treated As Related; Dated Sep. 12, 2016; 2 pages.

\* cited by examiner

SELECTING SUBSETS OF PARTICIPANTS IN ELECTRONIC MESSAGE THREADS

BACKGROUND OF THE INVENTION

The present invention relates generally to the field of electronic messages, and more particularly to multi-party electronic message conversations.

On a daily basis, in both personal and professional lives, people engage in multi-party message conversations using electronic message services, such as email. Typically, when responding to an email message, users can select a couple of options to select whom they send the message to. For example, users can typically select a "Reply" option, which enables a user to respond only to the sender of the original message. Users can also typically select a "Reply All" option, which enables the user to reply to the sender of the original message as well as all of the recipients of the original message.

SUMMARY

Embodiments of the present invention provide methods, program products, and computer systems for selecting subsets of participants in electronic message threads. In one embodiment of the present invention, a method is provided comprising: identifying a first message; and generating a list of respondents for the first message comprising a sender of the first message, any respondents to the first message, any respondents to a child message of the first message, and any respondents to a sibling message of the first message.

DETAILED DESCRIPTION

Embodiments of the present invention recognize that in multi-party message conversations, only a subset of recipients may respond to and remain active (i.e., continue to respond) within the message conversation. As such, a user intending to continue the message conversation with those active individuals may only want to send a common response to those individuals who are active, while excluding those who have not responded at all or have stopped responding to the message conversation. For example, a user who sent out a message to 50 recipients may only want to continue the message conversation with the fifteen people who responded. Typically, to accomplish that objective, a user would have to manually identify and provide contact information for those the fifteen individuals who have responded, such as by selecting an option to reply to all the recipients, identify the user IDs (e.g., email addresses, usernames, etc.) of the fifteen individuals who have responded, and delete the user IDs of the thirty-five individuals who have not responded. Embodiments of the present invention provide solutions to identify this subset of active participants and continue the message conversation with those individuals. In this manner, as discussed in greater detail in this specification, embodiments of the present invention can be used to continue message conversations without having to manually identify these active participants from inactive participants.

Figure 1:
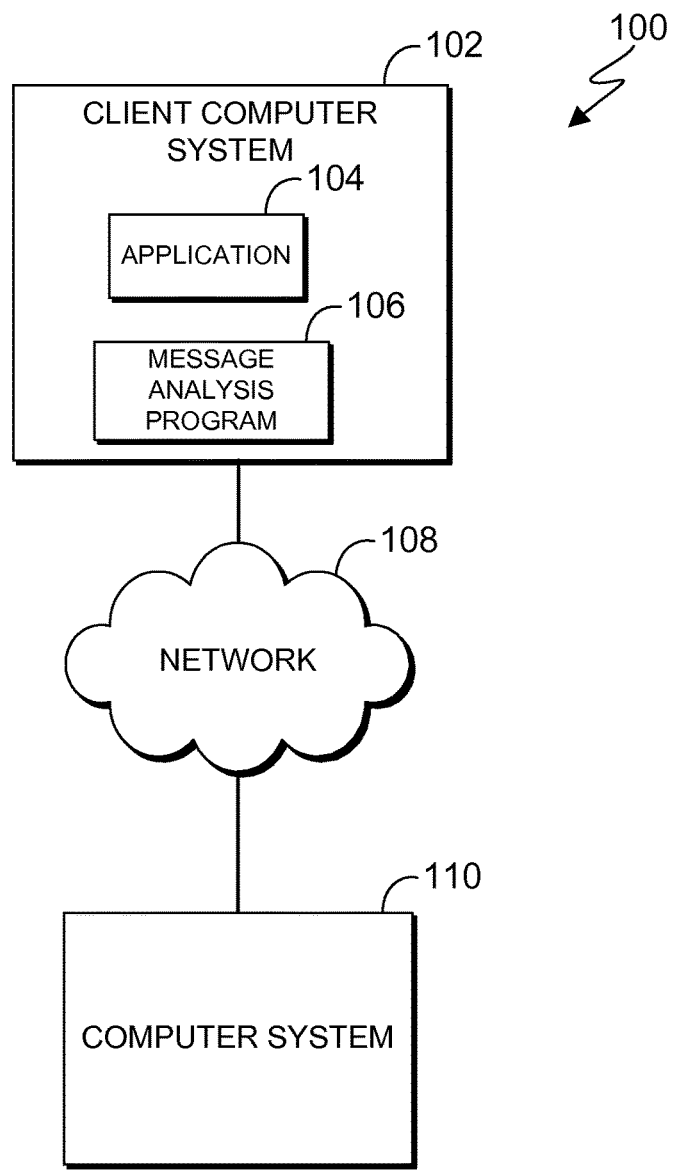
FIG. 1 is a functional block diagram illustrating a computing environment, in accordance with an embodiment of the present invention.

FIG. 1 is a functional block diagram of a computing environment 100, in accordance with an embodiment of the present invention. Computing environment 100 includes client computer system 102 and computer system 110, interconnected via network 108. Client computer system 102 and computer system 110 can be desktop computers, laptop computers, specialized computer servers, or any other computer systems known in the art. In certain embodiments, client computer system 102 and computer system 110 represent computer systems utilizing clustered computers and components to act as a single pool of seamless resources when accessed through network 108. In certain embodiments, client computer system 102 and computer system 110 represent virtual machines. In general, client computer system 102 and computer system 110 are representative of any electronic devices, or combination of electronic devices, capable of executing machine-readable program instructions, as described in greater detail with regard to FIG. 6.

Client computer system 102 includes application 104 and message analysis program 106. Application 104 enables client computer system 102 to manage electronic messages. For example, application 104 communicates with computer system 110 via network 108 (e.g., using TCP/IP) and one or more messaging services (not shown) to access, send, receive, and organize electronic messages. Application 104 can be implemented, for example, using a browser and web service that can access, organize, send, and receive messages.

Network 108 can be, for example, a local area network (LAN), a wide area network (WAN) such as the Internet, or a combination of the two, and include wired, wireless, or fiber optic connections. In general, network 108 can be any combination of connections and protocols that will support communications between client computer system 102 and computer system 110, in accordance with a desired embodiment of the invention. For illustrative purposes, this embodiment may be discussed with respect to application 104, facilitating sending and receiving electronic messages between client computer system 102 and computer system 110 via network 108.

Figure 2:
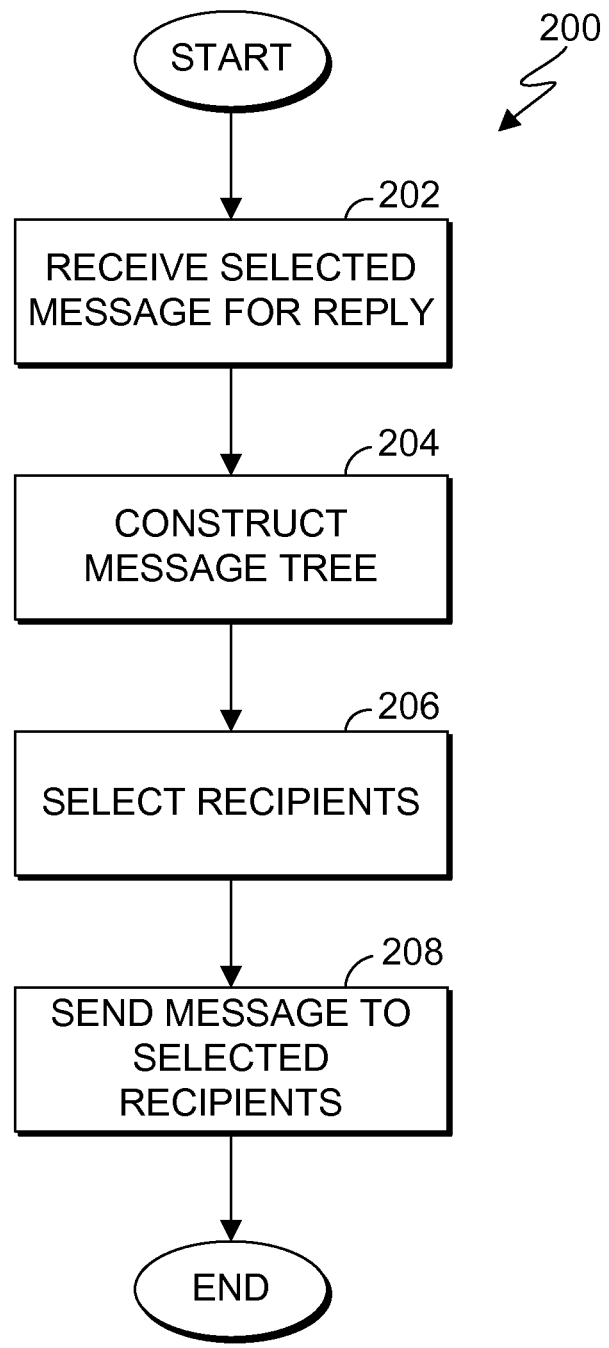
FIG. 2 is a flowchart illustrating operational steps for responding to electronic message threads, in accordance with an embodiment of the present invention.

FIG. 2 is a flowchart 200 illustrating operational steps for responding to electronic message threads, in accordance with an embodiment of the present invention.

In step 202, message analysis program 106 receives a selected message for reply from application 104. For example, application 104 can provide a user interface with which a user selects a message for reply, and application 104 can pass the selected message to message analysis program 106. In other embodiments, message analysis program 106 can receive a selected message from one or more other components of computing environment 100.

In step 204, message analysis program 106 constructs a message tree for the selected message. The term, "message tree", as used herein, refers to a relational data structure that defines relationships between a selected message and previous or subsequent messages linked to the selected message, outlining the various branches of the selected message. For example, the relationship between the selected message and a subsequent message can be a parent/child relationship (e.g., the selected message, and a response to the selected message). Relationships between multiple messages sent to more than one individual can be designated as having a sibling relationship (e.g., one or more messages sent in parallel to multiple recipients). Each message is associated with a respective message ID that distinguishes that message from another. The message tree can comprise multiple nodes representing each message in the message thread. In this embodiment, message analysis program 106 can configure the nodes to display a preview of the message. In other embodiments, other relational data structures can be used to define relationships between the selected message and other messages, such as graphs and tables.

In this embodiment, message analysis program 106 constructs a message tree for the selected message by identifying one or more parents, children, and/or siblings of the selected message and arranging the subsequent messages to provide a visual display of the relationship between messages. For example, a user could select message 1 ($M_1$) as the selected message. Message analysis program 106 can then identify that $M_1$ as the parent, and that $M_1$ was sent to five individuals (one through five, respectively). Message analysis program 106 can then classify the messages sent to those five individuals as siblings of the parent message, identified earlier as $M_1$.

In step 206, message analysis program 106 selects recipients for a new message based, at least in part, on the constructed message tree and activity level of recipients of the selected message. Subsets of recipients can be identified as active or inactive, based on whether that recipient responded to the selected message. For example, a recipient can be inactive if the recipient has not responded to the selected message. An inactive recipient can later become active if the inactive recipient responds, at any point in time, to the selected message, as discussed in greater detail with regard to FIG. 3.

In step 208, message analysis program 106 calls application 104 to send a new message to the selected participants. In this embodiment, application 104 sends the new message to computer system 110. In other embodiments, application 104 can send the new message to one or more other components of computing environment 100.

Accordingly, in this embodiment, a message is sent to a subset of participants of an original message based, at least in part, on activity level and whether participants have been recipients and/or senders of other messages related to the original message. In some instances, message analysis program 106 can select a subset of participants based on activity level. In other instances, message analysis program 106 can select a subset of participants based on user preference. Identifying related messages that were generated to respond to an original messages and identifying participants based on the generated responses (i.e., active participants) can streamline message communications by removing inactive (i.e., those participants that did not respond to the original message) participants from message conversations and reduce unwanted communications. Thus, this embodiment can improve message communications by identifying subsets of active participants and filtering out inactive individuals.

Figure 3:
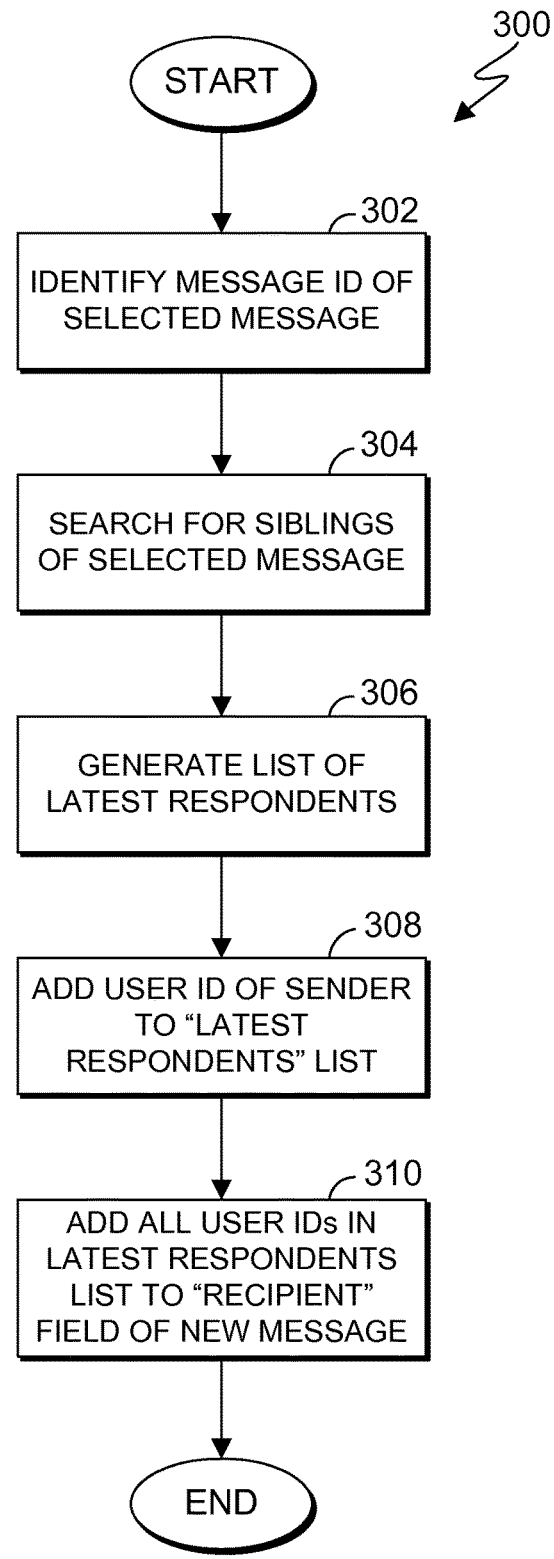
FIG. 3 is a flowchart illustrating operational steps for selecting subsets of participants in electronic message threads, in accordance with an embodiment of the present invention.

FIG. 3 is a flowchart 300 illustrating operational steps for selecting subsets of participants in electronic message threads, in accordance with an embodiment of the present invention. For example, the operational steps of FIG. 3 can be performed at step 206 of flowchart 200.

In step 302, message analysis program 106 identifies the message ID of the selected message. In this embodiment, message analysis program 106 identifies the message ID (i.e., the unique identifier for a digital message) of the selected message by traversing the message tree constructed in step 204 of flowchart 200 to read the message ID of the selected message.

In step 304, message analysis program 106 searches for siblings of the selected message. In this embodiment, message analysis program 106 searches for siblings of the selected message by traversing the messages tree constructed in step 204 of flowchart 200 and identifying messages having a sibling relationship with the selected message.

In step 306, message analysis program 106 generates a list of latest respondents. In this embodiment, message analysis program 106 generates a list of latest respondents based, at least in part, on activity level of recipients of the selected message. Each recipient is associated with a respective user ID that serves to distinguish that recipient from another. In this embodiment, message analysis program 106 can identify all message IDs of messages found as siblings that are responses to the selected message (i.e., messages generated as responses to the selected message). Message analysis program 106 can then extract the user IDs of those individuals in the identified message IDs, and add those user IDs to a "Latest Respondents List". The phrase "Latest Respondent List", as used herein, refers to a subset of recipients of a selected message that have responded to the sender of the selected message.

For example, a user may select a message that was sent to five recipients. Message analysis program 106 could construct a message tree and, using the constructed message tree, identify that of the five recipients, only three replied. Accordingly, message analysis program 106 can identify the message IDs of the messages sent in response to the selected message, extract the user IDs of the three recipients who responded to the selected message from the identified messages, and add those three user IDs the latest respondents list.

In another example, a user may select a message that was sent to five recipients (A, B, C, D, and E). Message analysis program 106 can construct a message tree and identify, based on the constructed message tree, that recipients A, B, and C responded and that recipient D did not respond. Message analysis program 106 can further identify that recipient E did not respond to the selected message, but forwarded the message to recipient F, who did respond to the selected message. Message analysis program 106 can then identify and extract the user IDs of the four recipients who responded (A, B, C and F) and add those user IDs to the latest respondents list. Recipient D is excluded because recipient D did not respond to the selected message. Recipient E is also excluded because although recipient E acted on the selected message by forwarding it to recipient F, recipient E did not respond to the selected message.

In yet another example, message analysis program 106 can construct a message tree for a selected message that was sent to 10 recipients (A-J) as part of message 1 ($M_1$). Message analysis program 106 can then identify, based on the constructed message tree, that five of those recipients (A, B, C, D, and E) responded to message $M_1$. At this juncture of the example, message analysis program 106 can then identify the user IDs of recipients A-E and add those user IDs to the latest respondents list.

Continuing the above example, the constructed message tree could branch to show that only recipients A, B, and C responded to a subsequent message ($M_2$). If message $M_2$ was selected, message analysis program 106 can identify the message IDs of the messages that were generated to respond to message $M_2$. Based on those identified message IDs, message analysis program 106 can identify the user IDs of recipients A, B, and C as active participants. Accordingly, message analysis program 106 can then add the user IDs of recipients A, B, and C to the latest respondents list. Message analysis program 106 excludes the user IDs of recipients D and E from the latest respondents list because they did not respond to message $M_2$.

In this embodiment, a recipient of the selected message that may have responded to the selected message after a subsequent message communication to the subset of recipients who responded earlier can also be added to the latest respondents list and receive future message communications. For example, a user may select a message that was sent to six recipients (A, B, C, D, E, and F). Message analysis program 106 could construct a message tree and identify that five of those recipients (A, B, C, D, and E) responded to the selected message (SM). Message analysis program 106 can then select the email IDs of recipients A, B, C, D, and E to send a subsequent message ($M_{SM}$). Subsequent to the sending of message $M_{SM}$, recipient F, the sixth individual in message SM, could reply to message SM. Message analysis program 106 can then add the email ID of recipient F to the latest respondents list for message $M_{SM}$. Thus, in future messages, the latest respondents list would include recipients A, B, C, D, E, and F.

In other embodiments, message analysis program 106 can prompt the user to send the history of a message communication to the recipient who responded after subsequent message communications transpired. For example, a user ($U_A$) may select a message ($M_1$) that was sent to six recipients (A, B, C, D, E, and F). Message analysis program 106 can construct a message tree and identify that five of those recipients (A, B, C, D, and E) responded to message $M_1$. Message analysis program 106 can further identify, via the constructed message tree, that $U_A$ sent a subsequent message ($M_2$) to recipients A, B, C, D, and E. Message analysis program 106 can further identify via the constructed message tree that user $U_A$ sent another subsequent message ($M_3$) to those same recipients. Message analysis program 106 can further identify that subsequent to message $M_3$, recipient F, responded to message $M_1$. Message analysis program 106 can then add recipient F to the latest respondents list and prompt user $U_A$ to send previous message communications $M_2$ and $M_3$ to recipient F.

In step 308, message analysis program 106 adds the user ID of the sender of a new message to the latest respondents list (i.e., the sender of a response). In this embodiment, message analysis program 106 reads the message ID of the sender from the message header of the new message. For example, in an email message, message analysis program 106 can identify the user ID of the sender from the header field which displays the user ID of the sender in the new message.

In step 310, message analysis program 106 adds all user IDs in the "latest respondents list" to the "recipient field" of a new message. The term, "recipient field", as used herein, refers to a field where user IDs of intended recipients of a new message can be entered. The recipient field can be denoted in application 104 in the header of a new message.

Accordingly, in this embodiment, a list of latest respondents is generated based on activity level. Identifying respondents based on activity level can improve message communications by removing inactive respondents from message conversations and reducing unwanted messages.

Figure 4:
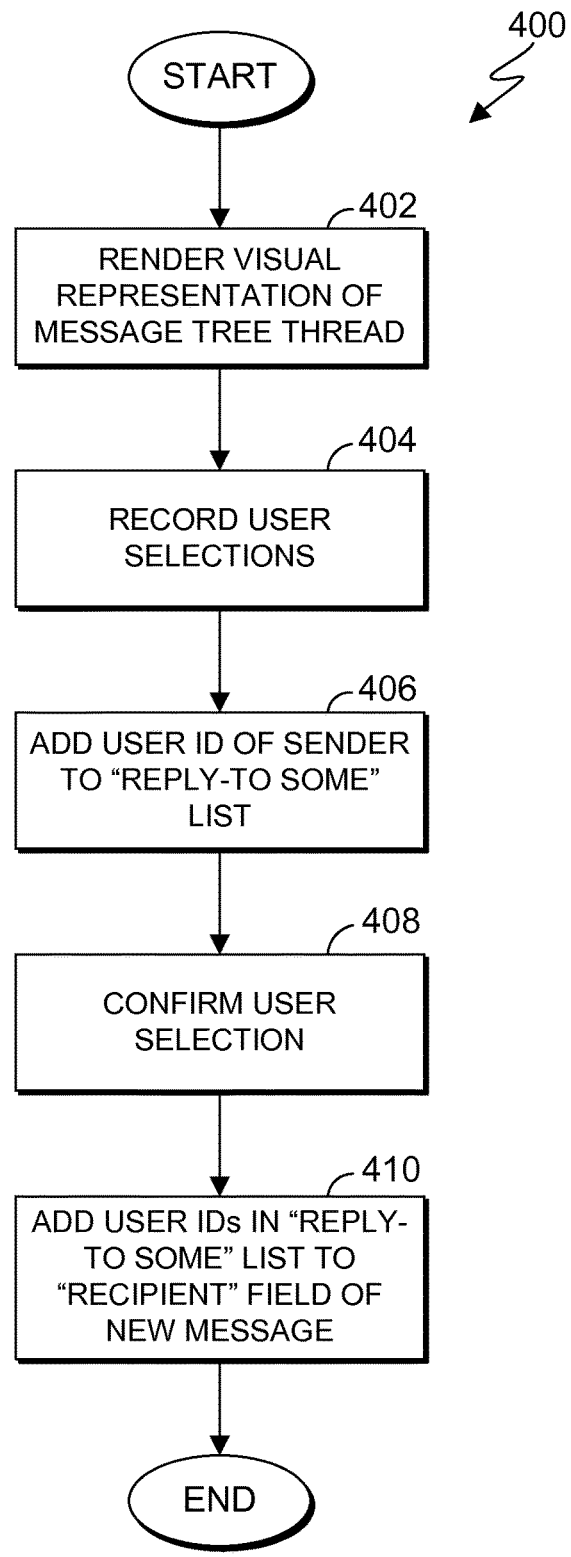
FIG. 4 is a flowchart illustrating operational steps for selecting subsets of participants in electronic message threads, in accordance with another embodiment of the present invention.

FIG. 4 is a flowchart 400 illustrating operational steps for selecting subsets of participants in electronic message threads, in accordance with another embodiment of the present invention. For example, the operational steps of FIG. 3 can be performed at step 206 of flowchart 200.

In step 402, message analysis program 106 displays a visual representation of the message tree to the user. In this embodiment, message analysis program 106 uses the message tree constructed in step 204 of flowchart 200 to display the visual representation of the message tree to the user. For example, the visual representation of the message tree can have branches to show messages and their relationships to each other. In other embodiments, the visual representation of the message tree displayed to the user can be in the form of a list of messages and their relationships. Other embodiments of the visual representation of the message tree can be graphs and/or tables that define relationships between the selected message and other messages.

In step 404, message analysis program 106 records user selections. In this embodiment, message analysis program 106 records user selections by prompting the user to select one or more messages, reading the message IDs from the selected messages, and extracting each respective user ID from the selected messages.

For example, message analysis program 106 can display the message tree constructed in step 204 of flowchart 200. The displayed message tree for a selected message ($M_1$), can indicate that message $M_1$ was sent to five recipients (A, B, C, D, and E). The constructed message tree can further show that recipients A, B, and C responded with messages $M_2$, $M_3$, and $M_4$, respectively. The constructed message tree can further show that recipient D did not respond. The constructed message tree can further show that recipient E responded to message $M_1$ creating message 5 ($M_5$), and subsequently forwarded the message creating message 6 ($M_6$) to recipient F, who did respond to $M_1$. A user can then select messages $M_{2-6}$. Message analysis program 106 can extract the user IDs belonging to those individuals associated with messages $M_{2-6}$ (recipients A, B, C, E, and F), and add those user IDs to the reply-to some list.

In step 406, message analysis program 106 adds the user ID of the selected messages as well as the user ID of the sender to the reply-to some list. In this embodiment, message analysis program 106 reads the user ID of the sender from the message header of the new message to add the user ID of the sender to the reply-to some list. Message analysis program 106 then adds the user IDs identified from the selected messages to the "Reply-to Some" List. The phrase, "Reply-to Some list", as used herein, refers to a subset of original recipients with which the sender chooses to continue the message communication.

In step 408, message analysis program 106 confirms that no additional messages are to be selected. In this embodiment, message analysis program 106 prompts the user to confirm that no additional messages are to be selected and processed to extract user IDs to add to the reply-to some list.

In step 410, message analysis program 106 adds all user IDs in the "Reply-to Some list" to the "recipient field" of the new message being created to reply to the selected message.

Accordingly, in this embodiment, a subset of participants of an original message are identified based, at least in part, on user preference and a constructed message tree. Identifying participants based on the constructed message tree can help improve message communications by providing a user a visual display of messages that a user may otherwise have overlooked.

Figure 5:
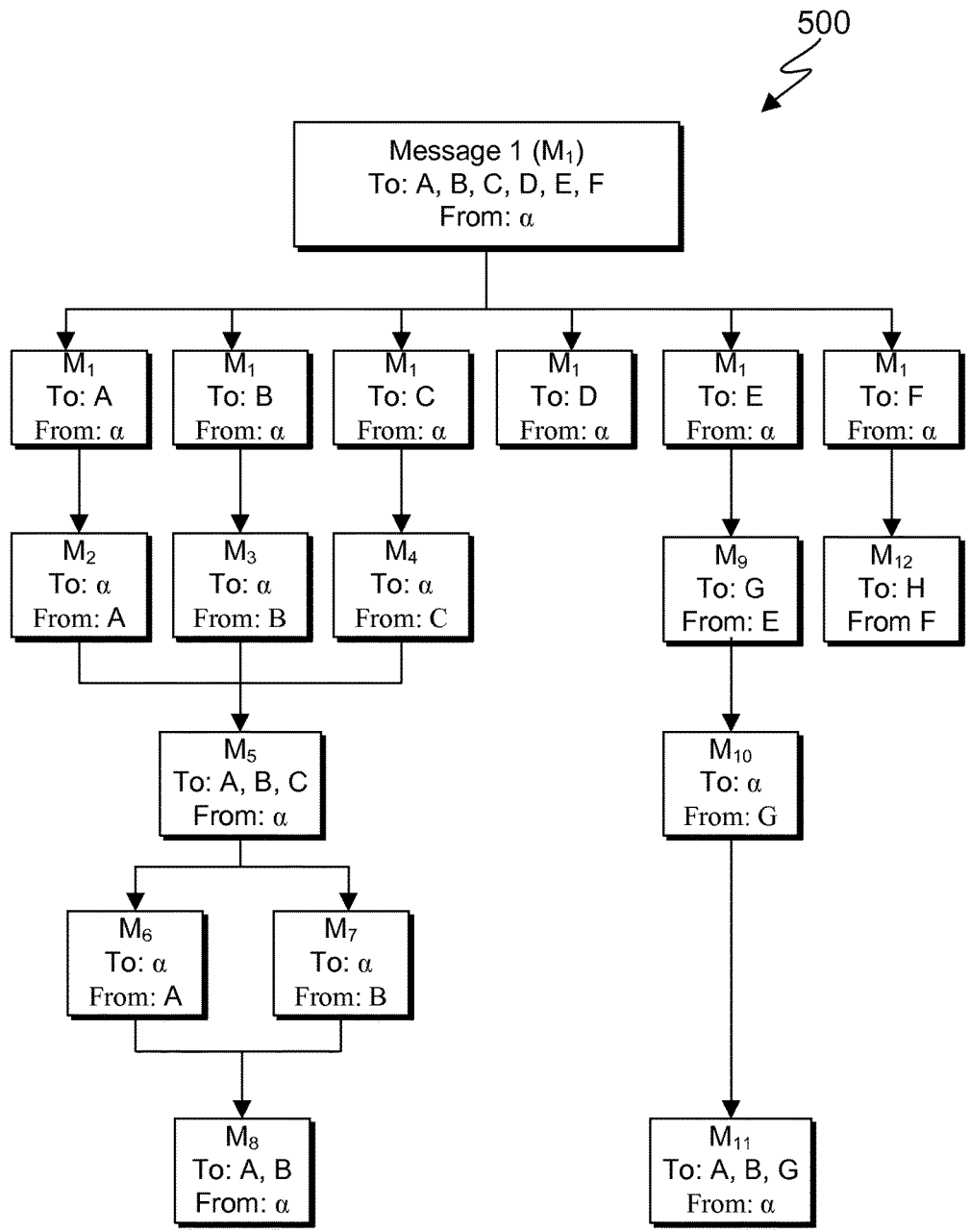
FIG. 5 is a block diagram of an example message tree through which subsets of participants in electronic message threads can be selected, in accordance with an embodiment of the present invention.

FIG. 5 is a block diagram 500 of an example message tree through which subsets of participants in electronic message threads can be selected, in accordance with an embodiment of the present invention. In this example, message analysis program 106 can identify, via a constructed message tree, that message 1 ($M_1$) was sent in parallel to six individuals with respective user IDs A-F from user ID a.

In this instance, if message $M_1$ was selected, message analysis program 106 can identify that, three messages ($M_{2-4}$) responded to message $M_1$. Message analysis program 106 can then extract the user IDs from the three identified messages and add the user IDs of recipients A-C to the latest respondents list. Message analysis program 106 would not identify recipients E and F as latest respondents because, although recipients E and F acted on message $M_1$ by generating message $M_9$ and message $M_{12}$, the recipients forwarded the selected message (i.e., message $M_1$) instead of responding to it.

If message $M_5$ was selected, message analysis program 106 can identify that two messages responded ($M_{6-7}$) to $M_1$. Message analysis program 106 can extract the user IDs from the two identified messages and add the user IDs of recipients A and B to the latest respondents list. Although recipient C used to be on the latest respondents list, recipient C would no longer be added to the latest respondent list since recipient C did not respond to the selected message (i.e., $M_5$).

If message $M_{10}$ was selected, message analysis program 106 can identify that message $M_{10}$ was a message generated in response to message $M_1$. Message analysis program 106 can further identify that messages $M_{2-4}$ were also generated in response to message $M_1$. Accordingly, message analysis program 106 can extract the user IDs from messages $M_{2-4}$, and 10 and add recipients A, B, C, and G to the latest respondents list. Message analysis program 106 can further prompt the sender to confirm whether to send previous message communications to user G that user G did not receive. Continuing the above example, message analysis program 106 can identify that message $M_5$ was sent before individual G responded to message $M_1$. In this embodiment, message analysis program 106 can prompt the sender to confirm whether to send the previous message communication, message $M_5$, to individual G.

Figure 6:
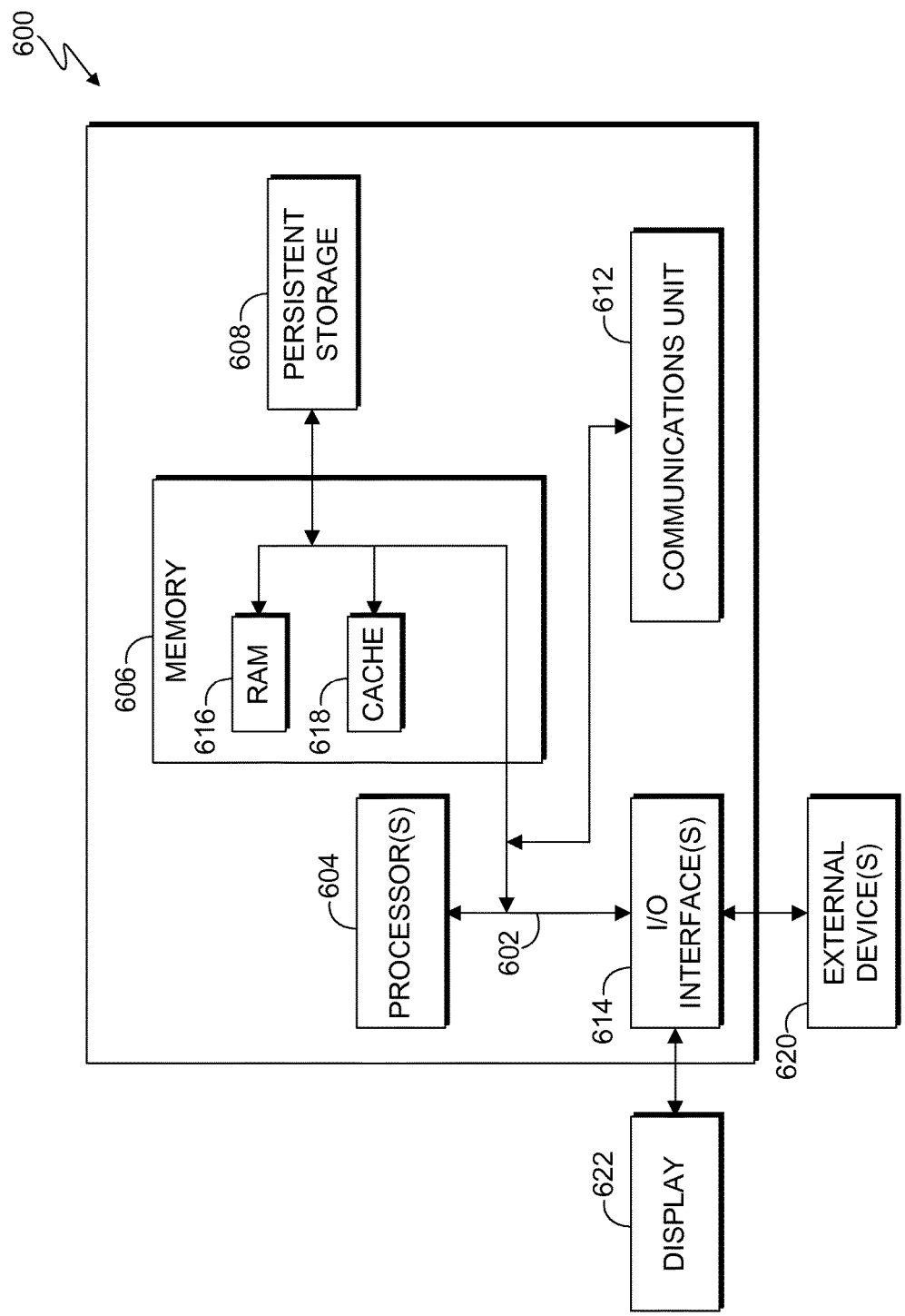
FIG. 6 is a block diagram of internal and external components of the computer systems of FIG. 1, in accordance with an embodiment of the present invention.

FIG. 6 is a block diagram of internal and external components of a computer system 600, which is representative the computer systems of FIG. 1, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 612 provides for communications with other computer systems or devices via a network (e.g., network 108). In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to client computer system 102 through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620 such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for selecting subsets of participants in electronic message threads, comprising:
   identifying, by one or more computer processors, a first message;
   generating, by one or more computer processors, a list of respondents for the first message comprising a sender of the first message, any respondents to the first message, any respondents to a child message of the first message, and any respondents to a sibling message of the first message;
   constructing, by one or more computer processors, a relational data structure for a message thread, wherein the relational data structure defines one or more relationships between the first message and one or more other messages in the message thread, wherein each relationship of the one or more relationships is a parent relationship, child relationship, or sibling relationship;
   generating, by one or more processors, a visual representation of the constructed relational data structure for the message thread;
   identifying, by one or more processors, a subset of respondents of the list of respondents from the constructed relational data structure that are active participants of the first message; and
   identifying, by one or more processors, user IDs associated with the subset of respondents from the list of respondents;
   continually refining, by one or more processors, the subset of respondents of the list of respondents that are active participants of the first message each time a new message is received.

2. The method of claim 1, wherein generating a list of respondents for the first message comprises:
   identifying, by one or more computer processors, one or more message IDs of the first message, one or more message IDs of any messages generated in response to the first message, one or more message IDs of any messages generated in response to the child of the first message, and one or more message IDs of any messages generated in response to the sibling message of the first message;
   identifying, by one or more computer processors, user IDs associated with the identified message IDs; and
   generating, by one or more computer processors, a list of respondents for the first message comprising the identified user IDs associated with the identified message IDs.

3. The method of claim 1, further comprising:
   generating, by one or more computer processors, a new message addressed to all respondents of the identified subset of respondents.

4. The method of claim 1, further comprising: displaying, by one or more computer processors, a visual representation of the constructed relational data structure for the message thread;
   receiving, by one or more computer processors, a user selection of one or more messages in the message thread via the displayed visual representation of the constructed relational data structure; and
   identifying, by one or more computer processors, a user ID for each of the selected messages.

5. The method of claim 4, wherein displaying, by one or more computer processors, a visual representation of the constructed relational data structure for the message thread comprises displaying a message tree for the message thread.

6. The method of claim 4, further comprising:
   generating, by one or more computer processors, the new message addressed to all participants in the generated list of participants.

7. A computer program product for selecting subsets of participants in electronic message threads, comprising:
   one or more computer readable storage media and program instructions stored on the one or more computer readable storage media, the program instructions comprising:
   program instructions to identify a first message;
   program instructions to generate a list of respondents for the first message comprising a sender of the first message, any respondents to the first message, any respondents to a child message of the first message, and any respondents to a sibling message of the first message;
   program instructions to construct a relational data structure for a message thread, wherein the relational data structure defines one or more relationships between the first message and one or more other messages in the message thread, wherein each relationship of the one or more relationships is a parent relationship, child relationship, or sibling relationship;
   program instructions to generate a visual representation of the constructed relational data structure for the message thread;
   program instructions to identify a subset of respondents of the list of respondents from the constructed relational data structure that are active participants of the first message;
   program instructions to identify user IDs associated with the subset of respondents of the list of respondents; and
   program instructions to continually refine the subset of respondents of the list of respondents that are active participants of the first message each time a new message is received.

8. The computer program product of claim 7, wherein the program instructions to generate a list of respondents for the first message comprise:
   program instructions to identify one or more message IDs of the first message, one or more message IDs of any messages generated in response to the first message, one or more message IDs of any messages generated in response to the child of the first message, and one or more message IDs of any messages generated in response to the sibling message of the first message;
   program instructions to identify user IDs associated with the identified message IDs; and
   program instructions to generate a list of respondents for the first message comprising the identified user IDs associated with the identified message IDs.

9. The computer program product of claim 7, wherein the program instructions stored on the one or more computer readable storage media further comprise:

program instructions to generate a new message addressed to all respondents of the identified subset of respondents.

10. The computer program product of claim 7, wherein the program instructions stored on the one or more computer readable storage media further comprise:
program instructions to display a visual representation of the constructed relational data structure for the message thread;
program instructions to receive a user selection of one or more messages in the message thread via the displayed visual representation of the constructed relational data structure; and program instructions to identify a user ID for each of the selected messages.

11. The computer program product of claim 10, wherein the program instructions to display a visual representation of the constructed relational data structure for the message thread comprise displaying a message tree for the message thread.

12. The computer program product of claim 10, wherein the program instructions stored on the one or more computer readable storage media further comprise:
program instructions to generate the new message addressed to all participants in the generated list of participants.

13. A computer system for selecting subsets of participants in electronic message threads, comprising:
one or more computer processors;
one or more computer readable storage media; and
program instructions stored on the one or more computer readable storage media for execution by at least one of the one or more processors, the program instructions comprising:
program instructions to identify a first message;
program instructions to generate a list of respondents for the first message comprising a sender of the first message, any respondents to the first message, any respondents to a child message of the first message, and any respondents to a sibling message of the first message;
program instructions to construct a relational data structure for a message thread, wherein the relational data structure defines one or more relationships between the first message and one or more other messages in the message thread, wherein each relationship of the one or more relationships is a parent relationship, child relationship, or sibling relationship;
program instructions to generate a visual representation of the constructed relational data structure for the message thread;
program instructions to identify a subset of respondents of the list of respondents from the constructed relational data structure that are active participants of the first message;
program instructions to identify user IDs associated with the subset of respondents from the list of respondents; and
program instructions to continually refine the subset of respondents of the list of respondents that are active participants of the first message each time a new message is received.

14. The computer system of claim 13, wherein the program instructions to generate a list of respondents for the first message comprise:
program instructions to identify one or more message IDs of the first message, one or more message IDs of any messages generated in response to the first message, one or more message IDs of any messages generated in response to the child of the first message, and one or more message IDs of any messages generated in response to the sibling message of the first message;
program instructions to identify user IDs associated with the identified message IDs; and
program instructions to generate a list of respondents for the first message comprising the identified user IDs associated with the identified message IDs.

15. The computer system of claim 13, wherein the program instructions stored on the one or more computer readable storage media further comprise:
program instructions to generate a new message addressed to all respondents of the identified subset of respondents.

16. The computer system of claim 13, wherein the program instructions stored on the one or more computer readable storage media further comprise:
program instructions to display a visual representation of the constructed relational data structure for the message thread;
program instructions to receive a user selection of one or more messages in the message thread via the displayed visual representation of the constructed relational data structure; and program instructions to identify a user ID for each of the selected messages.

17. The computer system of claim 16, wherein the program instructions to display a visual representation of the constructed relational data structure for the message thread comprise displaying a message tree for the message thread.

* * * * *